United States Patent
Saitoh et al.

(10) Patent No.: US 8,115,895 B2
(45) Date of Patent: Feb. 14, 2012

(54) OPTICAL COMPENSATION FILM AND LIQUID CRYSTAL DISPLAY DEVICE USING THE SAME

(75) Inventors: Yukito Saitoh, Minami-ashigara (JP); Mitsuyoshi Ichihashi, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 367 days.

(21) Appl. No.: 12/493,849

(22) Filed: Jun. 29, 2009

(65) Prior Publication Data

US 2009/0322993 A1   Dec. 31, 2009

(30) Foreign Application Priority Data

Jun. 30, 2008   (JP) ................. 2008-170203

(51) Int. Cl.
*G02F 1/1335*   (2006.01)

(52) U.S. Cl. ........................ 349/118; 349/117

(58) Field of Classification Search .......... None
See application file for complete search history.

(56) References Cited

U.S. PATENT DOCUMENTS

| | | | |
|---|---|---|---|
| 5,680,184 A * | 10/1997 | Nishino | 349/78 |
| 7,031,053 B2 * | 4/2006 | Bobrov et al. | 359/352 |
| 7,667,801 B2 * | 2/2010 | Fukagawa et al. | 349/117 |
| 2005/0195348 A1 | 9/2005 | Saitoh et al. | |
| 2006/0132686 A1 | 6/2006 | Jeon et al. | |
| 2008/0239213 A1 | 10/2008 | Ohmuro et al. | |
| 2009/0195733 A1 * | 8/2009 | Saitoh | 349/96 |
| 2010/0118241 A1 * | 5/2010 | Palto | 349/118 |

FOREIGN PATENT DOCUMENTS

| | | |
|---|---|---|
| JP | 3330574 B2 | 7/2002 |
| JP | 2005-221962 A | 8/2005 |
| JP | 2006-515686 A | 6/2006 |
| WO | WO 2004/068226 A1 | 8/2004 |

* cited by examiner

*Primary Examiner* — Wen-Ying P Chen
(74) *Attorney, Agent, or Firm* — Buchanan Ingersoll & Rooney PC

(57) ABSTRACT

An optical compensation film comprising a light absorbing layer capable of absorbing at least light of wavelength $\lambda$ nm in the visible light region is disclosed. The light absorbing layer has absorption anisotropy, light absorption coefficient $kz(\lambda)$ in the direction normal to the surface of layer (in the direction of z-axis), with respect to light of wavelength $\lambda$ nm in the visible light region, being larger than in-plane (x-y plane) light absorption coefficients $kx(\lambda)$ and $ky(\lambda)$; and the light absorbing layer has the larger degree of absorption anisotropy at the light of longer wavelength. A liquid crystal display device employing the film is also disclosed.

10 Claims, 5 Drawing Sheets

OPTICAL COMPENSATION FILM AND LIQUID CRYSTAL DISPLAY DEVICE USING THE SAME

CROSS-REFERENCE TO RELATED APPLICATIONS

This application claims benefit of priority under 35 U.S.C. 119 to Japanese Patent Application No. 2008-170203 filed on Jun. 30, 2008, which is expressly incorporated herein by reference in its entirety.

BACKGROUND OF THE INVENTION

1. Technical Field

The present invention relates to a novel optical compensation film useful for optical compensation of liquid crystal display devices, and a liquid crystal display device employing the same.

2. Background Art

A VA (vertically aligned)-mode liquid crystal display device has been known as a liquid crystal display device having wide viewing angle characteristics. The VA-mode liquid crystal display device is generally superior to liquid crystal displays of other modes in terms of high contrast, but suffers from large changes in contrast and color depending on viewing angle. In one known configuration aimed at solving this problem, polarizer plates are disposed on the upper and lower sides of a liquid crystal cell so as to align the absorption axes thereof orthogonal to each other, and an optically biaxial retardation film is further disposed between each of the polarizer plates and the liquid crystal cell, proving that degradation in the contrast depending on viewing angles may be reduced (see Japanese Examined Patent No. 3330574, for example).

It is, however, difficult to completely suppress leakage of light in the black state, when the pair of polarizer plates disposed while aligning the transmission axes orthogonal to each other are observed from oblique directions, because of displacement caused in the orthogonal relation between two transmission axes. Known proposals having been made on optical compensation films, capable solving this problems, include a biaxial retardation compensation film having predetermined wavelength dispersion characteristics of retardation in plane (Re) and retardation along the thickness direction (Rth) (see Published Japanese Translation of PCT International Publication for Patent Application No. 2006-515686, for example); and an optically biaxial optical compensation film showing a predetermined wavelength dispersion characteristic of Re/Rth (see Japanese Unexamined Patent Publication, "Tokkai" No. 2005-221962, for example).

While the VA-mode liquid crystal display devices were mentioned in the above, similar problems in the black state may occur also in TN-mode liquid crystal display devices. As a means for solving the problems, a proposal has been made on control of wavelength dispersion characteristics of Re and Rth of the optical compensation film.

SUMMARY OF THE INVENTION

It is, however, difficult to control the wavelength dispersion characteristics of Re and Rth in a manner contradictory to each other, as described in Published Japanese Translation of PCT International Publication for Patent Application No. 2006-515686, due to limitation on materials, and difficulty in the manufacturing.

It is therefore an object of the present invention to provide a novel optical compensation film, contributive to reduce leakage of light and color shift in the black state of liquid crystal display devices observed in oblique directions.

It is another object of the present invention to provide a novel liquid crystal display device, successfully moderated in leakage of light and color shift in the black state observed from oblique directions, by virtue of a novel optical compensation mechanism.

The present inventors conducted various studies, and as a result, they found that the above-described objects may be achieved by using a light absorbing layer capable of absorbing at least light of wavelength $\lambda$ nm in the visible light region, and having a predetermined absorption anisotropy. Based on the finding, the present inventors further went through investigations to complete the present invention.

The means for achieving the above mentioned objects are as follows.

[1] An optical compensation film comprising a light absorbing layer capable of absorbing at least light of wavelength $\lambda$ nm in the visible light region, Wherein the light absorbing layer has absorption anisotropy, light absorption coefficient $kz(\lambda)$ in the direction normal to the surface of layer (in the direction of z-axis), with respect to light of wavelength $\lambda$ nm in the visible light region, being larger than in-plane (x-y plane) light absorption coefficients $kx(\lambda)$ and $ky(\lambda)$, and the light absorbing layer has the larger degree of absorption anisotropy at the light of longer wavelength.

[2] The optical compensation film as set forth in [1], wherein the light absorbing layer has a parameter $A(\lambda)$ with respect to light of wavelength $\lambda$ nm in the visible light region, which satisfies $A(450) < A(550) < A(630)$:

$A(\lambda)$ being defined as $$A(\lambda) = \{kz(\lambda) - (kx(\lambda) + ky(\lambda))/2\} \times d/\lambda,$$

where d represents the thickness of the light absorbing layer, $kx(\lambda)$ and $ky(\lambda)$ represent absorption coefficients with respect to light of wavelength $\lambda$ respectively in the directions of x-axis and y-axis which are orthogonal to each other in the plane of the light absorbing layer, and $kz(\lambda)$ represents a light absorption coefficient with respect to light of wavelength $\lambda$ in the direction of z-axis which is normal to the plane (x-y plane) of the layer.

[3] The optical compensation film as set forth in [2], wherein the light absorbing layer has A(450) of from 0 to 0.01, A(550) of from 0.02 to 0.03, and A(630) of from 0.03 to 0.05.

[4] The optical compensation film as set forth in [1], wherein the light absorbing layer comprises at least a rod-like liquid crystal fixed in a vertical alignment, and a dye.

[5] The optical compensation film as set forth in [1], further comprising a transparent film.

[6] The optical compensation film as set forth in [1], further comprising a biaxial transparent film.

[7] The optical compensation film of as set forth in [1], further comprising an optically anisotropic layer comprising a discotic liquid crystal fixed in a hybrid alignment, or the light absorbing layer comprising a discotic liquid crystal fixed in a hybrid alignment.

[8] A liquid crystal display device comprising the optical compensation film as set forth in [1].

[9] A VA-mode liquid crystal display device comprising:
a pair of polarizers,
a VA-mode liquid crystal cell disposed therebetween, and the optical compensation film as set forth in [6] disposed between each of the pair of polarizers and the liquid crystal cell.

[10] A TN-mode liquid crystal display device comprising:
a pair of polarizers,
a TN-mode liquid crystal cell disposed therebetween, and
the optical compensation film as set forth in [7] disposed between each of the pair of polarizers and the liquid crystal cell.

According to the present invention, a novel optical compensation film, contributive to moderate leakage of light and color shift in the black state of liquid crystal display devices observed from oblique directions, may be provided.

According to the present invention, also a novel liquid crystal display device, successfully moderated in the leakage of light and color shift in the black state observed from oblique directions, by virtue of a novel optical compensation action, may be provided.

Figure 1:
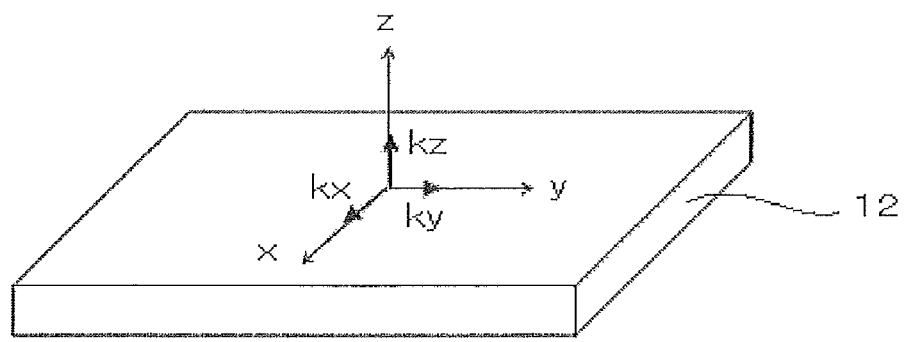
FIG. 1 is a schematic drawing explaining characteristics of a light absorbing layer of an optical compensation film of the present invention.

Reference numerals and symbols in the drawings are as follow:
10, 10a, 10b: optical compensation film;
12, 12a, 12b: light absorbing layer;
14, 14a, 14b: transparent film;
LC: liquid crystal cell;
PLa, PLb: polarizer;
200: light absorbing layer;
201: polarizer plate protective film;
202: polarizer film;
203: optical compensation sheet;
204: transparent base film;
205: optically anisotropic layer;
206: liquid crystal cell;
207: liquid crystal layer;
208: back light;
209: elliptic polarizer plate;
211: direction of absorption axis of upper polarizer plate;
212: direction of rubbing on upper substrate side of liquid crystal cell;
213: direction of rubbing on lower substrate side of liquid crystal cell;
214: direction of absorption axis of lower polarizer plate;
220: optical compensation sheet of the present invention;
221, 222, 223: directions of observation of Re(0) and Re(±40); and
224: direction of alignment of liquid crystalline compound.

DETAILED DESCRIPTION OF THE INVENTION

The present invention will be detailed below. Note that, in this patent specification, any numerical expressions in a style of " . . . to . . . " will be used to indicate a range including the lower and upper limits represented by the numerals given before and after "to", respectively. The "visible light region" in the context of this patent specification means the wavelength range from 380 nm to 780 nm. It is to be understood also that values, numerical ranges, and qualitative expressions (expressions such s "equivalent" and "equal") depicting optical characteristics of the individual components, such as the optical compensation film, liquid crystal layer and so forth, indicate values, numerical ranges and properties containing errors generally allowable to liquid crystal display devices and components used therefor.

The present invention relates to an optical compensation film which has a light absorbing layer capable of absorbing at least light in the visible light region, wherein the light absorbing layer has an absorption anisotropy, light absorption coefficient in the direction normal to the surface of layer, with respect to light in the visible light region, being larger than in-plane light absorption coefficients, and the degree of absorption anisotropy is larger with respect to light of longer wavelength. The optical compensation film of the present invention may be composed of the light absorbing layer alone, or may have other component(s) such as a transparent film, together with the light absorbing layer.

The absorption coefficient k is also called attenuation index, indicating to what degree of energy of light can be absorbed in a substance. In general, the real component "n" of the complex refractive index means so-called refractive index, and the imaginary component "k" of the complex refractive index means the absorption coefficient. Note that k described in the present invention is a physical parameter different from so-called attenuation coefficient α. Attenuation index and attenuation coefficient are detailed, for example, in Max Born and Emil Wolf, "Principles of Optics, 7th (expanded) edition", 4.11.2 "Beam propagation in an absorbing medium", p. 218-219.

FIG. 1 illustrates a schematic drawing explaining absorption characteristics of the light absorbing layer. As illustrated in FIG. 1, assuming now that axes orthogonal to each other in the plane of the light absorbing layer as x-axis and y-axis, and assuming an axis stands normal to the surface of the layer (x-y plane) as z-axis, the light absorbing layer is characterized in that absorption coefficient $kz(\lambda)$ with respect to light of wavelength $\lambda$ in the direction of z-axis normal to the surface of layer (x-y plane) is largest, as compared with light absorption coefficients $kx(\lambda)$ and $ky(\lambda)$ with respect to light of wavelength $\lambda$ in the directions of the x-axis and the y-axis, respectively.

In the present invention, a light absorbing layer having the larger degree of absorption anisotropy with respect to light of longer wavelength, may be used as the light absorbing layer.

The degree of absorption anisotropy may be expressed by various parameters, typically exemplified by $A(\lambda)$ defined as below:

$$A(\lambda)=\{kz(\lambda)-(kx(\lambda)+ky(\lambda))/2\}\times d/\lambda$$

where d represents the thickness of the light absorbing layer, and $kx(\lambda)$, $ky(\lambda)$ and $kz(\lambda)$ represent absorption coefficients with respect to light of wavelength $\lambda$ respectively in the directions of the x-axis, y-axis and z-axis as described in the above.

One example of the light absorbing layer may be a light absorbing layer which satisfies $A(450)<A(550)<A(630)$.

It is not always necessary for the light absorbing layer used in the present invention to exhibit absorption anisotropy over the entire range of the visible light region, but may exhibit absorption isotropy typically with respect to light of a shorter wavelength of 450 nm or around (that is, $A(450)=0$). An exemplary light absorbing layer may be such as having $A(450)$ of from 0 to 0.01 or around, $A(550)$ of from 0.02 to 0.03 or around, and $A(630)$ of from 0.03 to 0.05 or around, but is not limited thereto.

Which is the largest among the absorption coefficients $kx(\lambda)$, $ky(\lambda)$ and $kz(\lambda)$ may be known by values of absorption anisotropy (diattenuation) of a sample, measured by using a spectropolarimeter "AxoScan" from Axometics Inc. The degree of absorption anisotropy $A(\lambda)$ may be determined by measuring the Mueller matrices using the above-described measuring instrument, while varying the polar angle over a predetermined range (−50 to 5°, for example) in the direction of fast axis, at predetermined intervals (10°, for example) at a plurality of wavelengths $\lambda$, followed by fitting.

In the present invention, the light absorbing layer satisfying the above-described characteristics is used in order to moderate leakage of light and color shift in the black state, meanwhile the light absorbing layer having a large absorption coefficient and/or a large thickness may result in decrease in the light transmittance in the white state. For this reason, the light absorbing layer preferably has absorption coefficients $kz(x)$, $ky(\lambda)$ and $kz(\lambda)$ in the visible light region respectively in the range from 0 to 0.05 or around, and a thickness of 0.1 to 90 μm or around.

Figure 2:
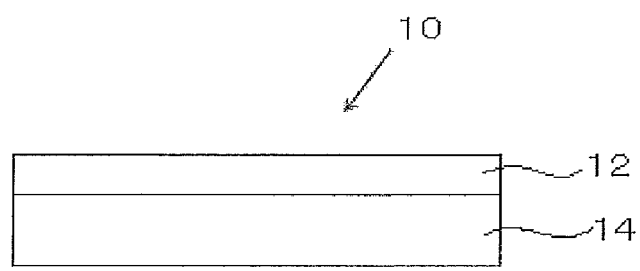
FIG. 2 is a schematic sectional view of an exemplary optical compensation film of the present invention.
Figure 3:
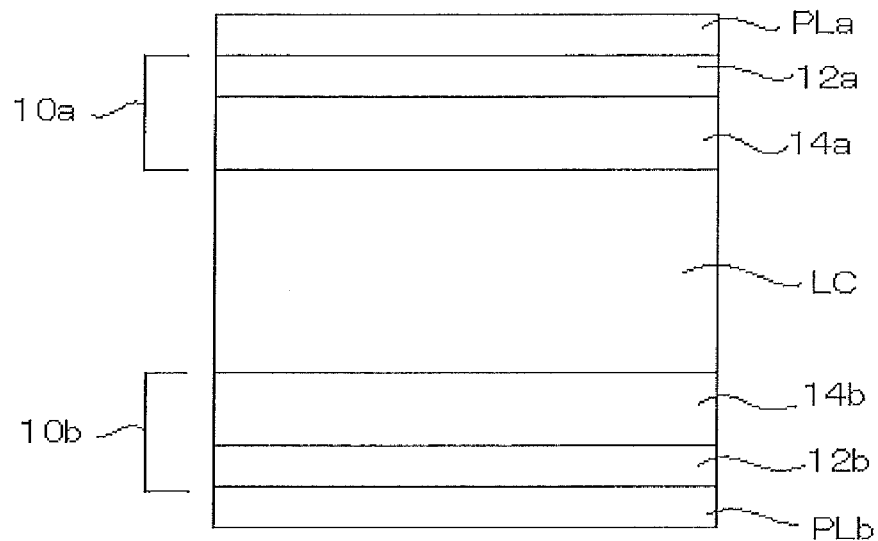
FIG. 3 is a schematic sectional view of an exemplary VA-mode liquid crystal display device of the present invention.
Figure 4:
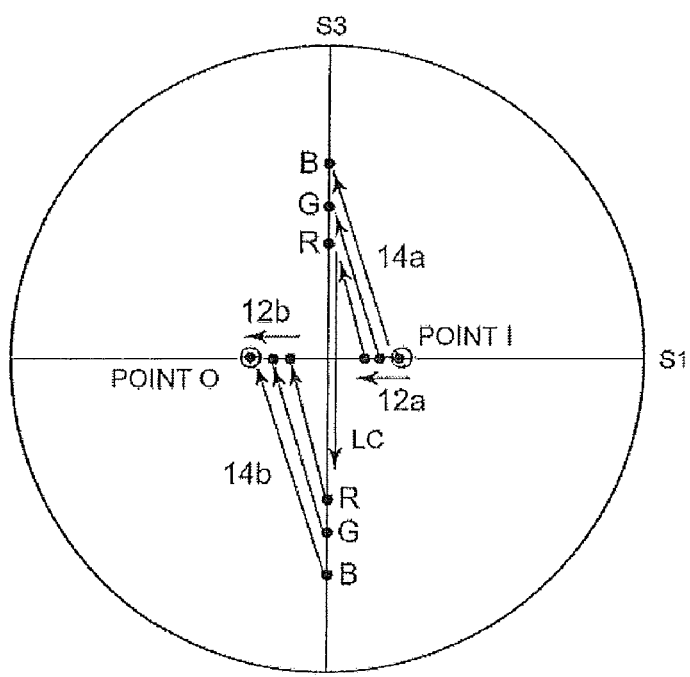
FIG. 4 is a schematic drawing of a two-dimensional projection of the Poincaré sphere used for explaining an exemplary optical compensation action of the optical compensation film of the present invention.

Next, operations of the optical compensation film of the present invention will be explained using the Poincaré sphere. FIG. 2 is a schematic sectional view of an exemplary optical compensation film of the present invention, and FIG. 3 is a schematic sectional view of an exemplary VA-mode liquid crystal display device employing the optical compensation film illustrated in FIG. 2. FIG. 4 is a schematic drawing illustrating a locus of polarization of incident light, which passes through the VA-mode liquid crystal display device illustrated in FIG. 3, mapped on the Poincaré sphere.

The optical compensation film 10 illustrated in FIG. 2 has a light absorbing layer 12 which satisfies the above-described characteristics, and a transparent film 14. The transparent film 14 is an optically biaxial film, that is, a film which satisfies the relation $nx>ny>nz$, assuming principal average refractive indices in the in-plane directions of the x-axis and y-axis orthogonal to each other as nx and ny (where, $ny \leq nx$), respectively, and assuming principal average refractive index in the direction of z-axis normal to the x-y plane as nz. The transparent film 14 is a biaxial film having conventionally been used for optical compensation in the black state of VA-mode liquid crystal display devices, and has Re(550) of from 30 to 90 nm or around, and Rth(550) of from 100 to 300 nm or around.

FIG. 3 is a schematic sectional view illustrating an exemplary liquid crystal display device having the optical compensation film 10. The liquid crystal display device illustrated in FIG. 3 has optical compensation film 10a and 10b respectively disposed between a VA-mode liquid crystal cell LC and each of a pair of polarizers PLa and PLb. Each of the optical compensation films 10a and 10b is the optical compensation film 10 illustrated in FIG. 2, and has light absorbing layers 12a, 12b, and transparent films 14a, 14b. The transparent film 14a, 14b, which are biaxial films, have in-plane slow axes, and the optical compensation films 10a and 10b are disposed so as to align the in-plane slow axes of the transparent films 14a and 14b orthogonal to each other. The pair of polarizers PLa and PLb are disposed so as to align the absorption axes thereof orthogonal to each other, and so as to align them parallel to or orthogonal to the in-plane slow axes of the closer ones of the transparent film 14a and 14b. Note that, the polarizers PLa, PLb generally have stacked structure having protective films bonded on both surfaces of a polarizer film, whereas the polarizer illustrated herein has a single-layer structure for simplicity of explanation. Of course, the optical compensation films 10a, 10b may be protective films of the polarizers PLa, PLb.

In FIG. 3, light comes from the lower side of the drawing, or is incident on the polarizer PLa side. Under no applied voltage, liquid crystal molecules in the liquid crystal cell LC align almost vertical to the surfaces of the substrates. Each of the optical compensation films 10a and 10b acts so as to convert the polarization state of any wavelength of light over the entire visible light region, including red (R) light, green (G) light and blue (B) light, incident on the polarizer PLa from oblique directions inclined away from the in-plane absorption axis of the polarizer plate (off-axis direction typically in the 45° direction) at a polar angle of not zero, into the polarization state possibly intercepted by the polarizer PLb in the black state.

This action will be explained referring to the Poincaré sphere in FIG. 4, but now the explanation is preceded by another explanation on an optical compensation action in a comparative configuration illustrated in FIG. 7, with respect to a conventional VA-mode liquid crystal display device having no light absorbing layer, and having biaxial films "a" and "b" similarly disposed therein, referring to the Poincaré sphere illustrated in FIG. 8. Note that the Poincaré spheres illustrated in FIG. 4 and FIG. 8 are three-dimensional map depicting the polarization state, where the equator of the sphere represents the state of linear polarization having an ellipticity of 0. Azimuth and polar angle of the incident light are 45° and 60°, respectively. FIG. 4 and FIG. 8 are drawings illustrating two-dimensional projections of the Poincaré sphere as viewed from the positive side on the S2 axis. Point I in each of FIG. 4 and FIG. 8 represents a state of linear polarization of light obliquely incident on the polarizer PLb on the top surface side in the black state, and then converted into linearly polarized light while passing through the polarizer PLb. If polarization state point I can be converted to polarization state point O which indicates an extinction point on the S1 axis, leakage of light of the liquid crystal display device in the black state observed in oblique directions may be moderated. While loci of conversion of the polarization states are generally expressed by rotation around predetermined axes, the examples illustrated in FIG. 4 and FIG. 8 express the loci by straight lines projected on a plane.

Figure 7:
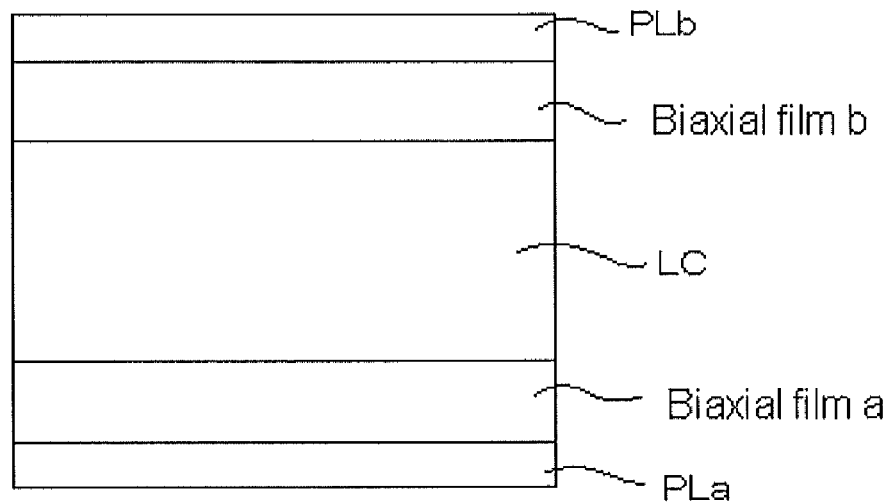
FIG. 7 is a schematic sectional view of an exemplary conventional VA-mode liquid crystal display device.
Figure 8:
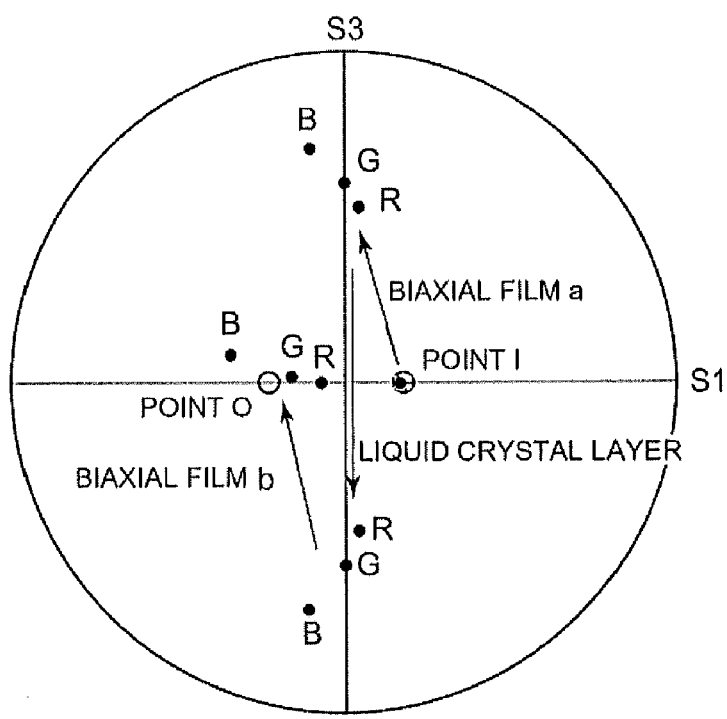
FIG. 8 is a schematic drawing of a two-dimensional projection of the Poincaré sphere used for explaining an exemplary optical compensation mechanism of a conventional optical compensation film used for VA-mode liquid crystal display devices.

The biaxial films "a" and "b" used in the liquid crystal display device illustrated in FIG. 7 are general polymer films, wherein wavelength dispersion characteristics of Re and Rth of most polymers are "regular" with respect to light in the visible light region (more specifically, Re and Rth become larger as the wavelength become shorter), with some exceptions showing almost constant wavelength dispersion characteristics irrespective of wavelength, or reversed wavelength dispersion characteristics (more specifically, Re and Rth become smaller as the wavelength become shorter) only to a limited degree. Conversion of the polarization state caused by passing through the biaxial films "a" and "b" may be expressed on the Poincaré sphere by rotations around predetermined axes as described in the above, wherein the angle of rotation is proportional to retardation of the biaxial films "a" and "b", and inversely proportional to the wavelength of incident light. Accordingly, the polarization state of light passed through the biaxial film "a", typically having regular wavelength dispersion characteristics of retardation which are general to most polymers, may be such as causing splitting among R light, G light and B light as illustrated in FIG. 8, rather than being converged. It may be understood that the splitting is not resolved even after the light passes through the liquid crystal cell LC, and further through the biaxial film "b", showing the polarization states of R light and B light converted at points away from the extinction point O. This may be causative of leakage of light and color shift in the black state of the VA-mode liquid crystal display device observed in oblique directions.

On the other hand, the liquid crystal display device of the present invention illustrated in FIG. 3 makes use of the optical compensation films 10a, 10b having the light absorbing layers 12a, 12b, so that the polarization states of all of R light, G light and B light are successfully converted to the polarization state at the extinction point O as illustrated in FIG. 4, and thereby leakage of light and color shift in the black state possibly observed in oblique directions may be moderated. More specifically, as illustrated in FIG. 4, the linearly polarized light passed through the polarizer PLa is converted, as a result of passing through the light absorbing layer 12a having a predetermined absorption anisotropy, according to transition expressed by arrows which extend leftwards from point I, in parallel with the S1 axis in the drawing (arrows extend towards the horizontal linear polarization state on the Poincaré sphere, as expressed by the points of S1=1, S2=0 and S3=0), and thereby splits into R light, G light and B light. The transition is ascribable to the absorption anisotropy of the light absorbing layer 12a, showing a maximum absorption coefficient in the direction of z-axis, and showing also the degree of absorption anisotropy which becomes larger on the longer wavelength side. The light then passes through the biaxial transparent film 14a, thereby R light, G light and B light are converted in their polarization states by rotation respectively at different angles of rotation which are ascribable to the regular wavelength dispersion characteristics of retardation of the transparent film 14a, or difference in the wavelength of incident light. In this process, since the polarization states of R light, G light and B light originally split on the S1 axis after passing through the light absorbing layer 12a, the difference among the individual angles of rotation allows any of R light, G light and B light to be converted onto the arc represented by S1=0 on the Poincaré sphere, as illustrated in FIG. 4. The split of the polarization states of R light, G light and B light on the arc represented by S1=0 are resolved by passing through the liquid crystal cell LC, and further through the optical compensation film 10b which is identical to the optical compensation film 10a, thereby the polarization states of any of R light, G light and B light may be converted to the extinction point O.

According to the operation of the present invention, such as preventing the polarization states of R light, G light and B light from becoming non-coincident, or from splitting, by shifting them towards the horizontal linear polarization state side on the Poincaré sphere, to a larger degree with respect to light of longer wavelength as described in the above. Therefore, according to the optical compensation mechanism used in the invention, it is possible to resolve the problems originally ascribable to the wavelength dispersion of the polymer film, and to obtain effects of reducing both of color shift and leakage of light under off-axis conditions.

Note that the example illustrated in FIG. 4 is merely one example, by which the optical compensation effect of the optical compensation film of the present invention is not limited. Any embodiments allowing the light absorbing layer, having a predetermined absorption anisotropy, to contribute to optical compensation may be included in the scope of the present invention. The optical compensation film of the present invention, disposed in the example illustrated in FIG. 3 so as to oppose the light absorbing layer with the polarizer, may inversely be disposed, or more specifically, so as to dispose the biaxial transparent film on the polarizer side, yielding equivalent effects.

Although paragraphs in the above described the effects of the present invention referring to the VA-mode liquid crystal display devices, equivalent effects may be obtained by other liquid crystal display devices such as those based on the TN mode.

Materials and methods which can be used for preparing the optical compensation film of the present invention will be detailed below.

The light absorbing layer owned by the optical compensation film of the present invention, having the characteristics described in the above, may be prepared according to any one of various methods. For example, the light absorbing layer having the above-described characteristics may be formed by a liquid crystal composition containing a rod-like liquid crystal and a dye. More specifically, the light absorbing layer is prepared as follows. The liquid crystal composition is applied to a surface so as to vertically align molecules of the rod-like liquid crystal, while aligning also dye molecules in association with the liquid crystal molecules. The state of alignment is fixed according to polymerization reaction or crosslinking reaction, to thereby form the light absorbing layer having the above-described characteristics.

Liquid crystal materials which can be used in the methods are not specifically limited so far as they are rod-like liquid crystals. Examples of the materials include thermotropic liquid crystals, liquid crystals showing a nematic phase and/or smectic phase, ionic liquid crystals, lyotropic liquid crystals and chromonic liquid crystal. Examples of the adoptable rod-like liquid crystal compound include azomethine compounds, azoxy compounds, cyanobiphenyl compounds, cyanophenyl esters, benzoate esters, phenyl cyclohexanecarboxylates, cyanophenylcyclohexane compounds, cyano-substituted phenylpyrimidine compounds, alkoxy-substituted phenylpyrimidine compounds, phenyldioxane compounds, tolane compounds and alkenylcyclohexyl benzonitrile compounds. Also materials containing a residue of rod-like liquid crystal, such as metal complex, liquid crystal polymer or the like, may be adoptable. The rod-like liquid crystal compounds are described in Kikan Kagaku Sosetsu (Quarterly Chemical Review), Vol. 22 "Ekisho no Kagaku (Chemistry of Liquid Crystal) (1994), edited by the Chemical Society of Japan", Chapters 4, 7 and 11; "Handbook of Liquid Crystals", Vol. 2A, Vol. 2B, and Vol. 3; and Ekisho Debaisu Handobukku (Liquid Device Handbook), edited by the 142-nd Committee of Japan Society for the Promotion of Science, Chapter 3. The birefringence index of the rod-like liquid crystal compounds used in the present invention preferably falls in the range from 0.001 to 0.7.

The rod-like liquid crystal compounds adoptable to the present invention preferably has a polymerizable group so as to fix the state of alignment. The polymerizable group is preferably an unsaturated polymerizable group or epoxy group, wherein unsaturated polymerizable group is more preferable, and ethylenic unsaturated polymerizable group is particularly preferable.

The dye adoptable to the above-described method is preferably dichroic dye showing different absorption characteristics in the directions of long axis and short axis of the molecule. The dichroic dye may be used in any form of crystal, associate, or dye alone, so far as it gathers in a state capable of exhibiting dichroism. The associate preferably has a longer diameter of from 5 nm to 1 µm, more preferably from 10 nm to 400 nm, and most preferably from 20 nm to 100 nm. Chromophore of the dye adoptable herein is not specifically limited. Specific examples of the dye include azo dyes, anthraquinone dyes, perylene dyes, merocyanine dyes, azomethine dyes, phthaloperylene dyes, indigo dyes, azulene dyes, dioxazine dyes, polythiophene dyes, and phenoxazine dyes. Among these, azo dyes, anthraquinone dyes and phenoxazine dyes are more preferable, and anthraquinone dyes, phenoxazone dyes (phenoxazine-3-one) and so forth are most preferably used.

The azo dye may be any of monoazo dye, bisazo dye, trisazo dye, tetrakisazo dye, pentakisazo dye and so on, wherein monoazo dye, bisazo dye and trisazo dye are preferable. Examples of ring structure contained in the azo dye may be aromatic ring (benzene ring, naphthalene ring and so forth), or may be heterocycle (quinoline ring, pyridine ring, thiazole ring, benzothiazole ring, oxazole ring, benzoxazole ring, imidazole ring, benzoimidazole ring, pyrimidine ring and so forth).

Substituents of the anthraquinone dye are preferably those containing oxygen atom, sulfur atom or nitrogen atom, which are exemplified by alkoxy, aryloxy, alkylthio, arylthio, alkylamino, and arylamino groups. The number of substitution by the substituents is not specifically limited, wherein di-substituted, tri-substituted, tetrakis-substituted forms are preferable, and di-substituted and tri-substituted form are particularly preferable. Position of substitution by the substituents is not specifically limited, wherein the 1,4-di-substituted, 1,5-di-substituted 1,4,5-tri-substituted, 1,2,4-tri-substituted, 1,2,5-tri-substituted, 1,2,4,5-tetra-substituted, and 1,2,5,6-tetra-substituted structures are preferable.

Substituents of the phenoxazone dye (phenoxazine-3-one) are preferably those containing oxygen atom, sulfur atom or nitrogen atom, which are exemplified by alkoxy, aryloxy, alkylthio, arylthio, alkylamino, and arylamino groups.

The light absorbing layer having the above-described characteristics may be adjustable in $A(\lambda)$ at the individual wavelengths, by mixing a plurality of dichroic dyes under adjusted ratio of mixing. The adjustment is also accessible by varying the thickness. The dyes to be mixed preferably have maximum absorption wavelengths different from each other, and preferably have large dichroic ratios. The dichroic ratio is preferably 5 or larger, more preferably 15 or larger, and even more preferably 40 or larger.

It is also preferable to use dyes showing dichroism, showing broad absorption peaks over the RGB region, and showing absorption coefficients with respect to each of R, G and B lights, different from each other. Examples of such dye include those having a basic skeleton of the above-described dyes and having the electronic conjugation chain(s) extended from the skeleton; and associates thereof.

The composition may preferably be added with a vertical alignment enhancer in order to allow the rod-like liquid crystal molecules to vertically align. The vertical alignment enhancer may be a low-molecular-weight compound or may be a high-molecular-weight compound. Examples of the vertical alignment enhancer adoptable herein include those described in Japanese Unexamined Patent Publication, "Tokkai", Nos. 2006-98750, 2006-106662, 2006-113500, and 2006-259396.

Alternatively, the optical compensation film of the present invention may be composed only of the light absorbing film which exhibits absorption anisotropy. The film may be prepared typically by heating a composition containing the polymer material and the dye up to the glass transition temperature or higher so as to make the dye aligned in a predetermined state, and then cooling the composition to a temperature at which the film is used. The method is, however, not limited thereto.

An exemplary optical compensation film of the present invention has the light absorbing layer and the transparent film. Note that the "transparent film" herein means a film showing no absorbance of light in the visible light region, instead showing a transmittance of light of 80% or larger. The transparent film is composed of a polymer composition, materials of which are not specifically limited. Examples of adoptable materials include cellulose esters (for example, cellulose acetate and cellulose diacetate), norbornene-base polymers, and polymethyl methacrylate. Also commercially available polymers (norbornene-base polymers such as Arton (registered trade name) and Zeonex (registered trade name) may be adoptable. Among these, the film composed of the cellulose esters is preferable, and the film composed of lower fatty acid esters of cellulose is more preferable. The lower fatty acids herein mean those having 6 or smaller number of carbon atoms. In particular, those having 2 carbon atoms (cellulose acetate), 3 carbon atoms (cellulose propionate) or 4 carbon atoms (cellulose butyrate) are preferable.

Among these, the film composed of cellulose acetate is particularly preferable. Also mixed fatty acid ester, such as cellulose acetate propionate and cellulose acetate butyrate, may be adoptable.

Films having various optical characteristics, which have been adopted to the optical compensation film of liquid crystal display devices, such as biaxial film, A-plate, C-plate, $\lambda/4$ plate, $\lambda/2$ plate, PDM (Polymerized Discotic Material) film, and rod-like liquid crystal polymer film, may be adoptable as the transparent film in the invention. For example, it has conventionally been demanded that wavelength dispersion characteristics of retardation are adjusted so as to improve the optical compensation performance, but it has been difficult to satisfy the demands with respect to optical compensation film which is not readily be prepared due to limitations on the materials and labor-consuming nature of the manufacturing. In contrast, the optical compensation film of the present invention successfully improves the optical compensation performance by forming therein the light absorbing layer, without adjusting the wavelength dispersion characteristics of retardation, and is therefore adoptable to the transparent film while raising a large benefit. One example of such film may be a biaxial film conventionally used for optical compensation of the VA-mode liquid crystal display devices. For ideal optical compensation, the biaxial film is required to have reversed wavelength dispersion characteristics for Re, and regular wavelength dispersion characteristics for Rth, manufacturable only with great difficulty. However, by using the optical compensation film of the present invention, having the biaxial film used as the transparent film and the light absorbing layer formed thereon by the above-described method, it is now possible to realize an ideal optical compensation as illustrated in FIG. 4, without adjusting the wavelength dispersion characteristics of retardation.

Preferable ranges of Re and Rth of the biaxial film adoptable to optical compensation of the VA-mode liquid crystal display device may be those as described in the above.

Another example of the conventional optical compensation film is that used for the TN-mode liquid crystal display devices, having a support composed of a transparent film, and an optically anisotropic layer which contains a discotic liquid crystal fixed in a hybrid alignment state. For ideal optical compensation, the optical compensation film is required to have optimized wavelength dispersion characteristics of retardation, but is manufacturable only with difficulty, typically due to limitations on the materials. However, by using the optical compensation film of the present invention, having the light absorbing layer which satisfies the above-described characteristics formed to the optical compensation film, it is now possible to realize an ideal optical compensation of the TN-mode liquid crystal display devices without adjusting the wavelength dispersion characteristics of retardation. The light absorbing layer may be formed typically on the back surface of the support composed of the transparent film, that is, the surface on the side where no optically anisotropic layer is formed. Equivalent effects may be obtained also by an embodiment such that the transparent film and/or the optically anisotropic layer used as the support functions also as the light absorbing layer. As for the optical compensation film for the TN-mode liquid crystal display devices, various types of which are described in, and therefore referable to various patent publications such as Japanese Unexamined Patent Publication, "Tokkai", No. 2002-169023. The effects of the present invention may be obtainable not only by the optical compensation film having a support composed of a transparent film and the above-described optically anisotropic layer, but may similarly be obtained also by the optical compensation films for various TN-type liquid crystal display devices, composed of one or two sheets of birefringent polymer film.

In the description, $Re(\lambda)$ (unit: nm) and $Rth(\lambda)$ (unit: nm) each indicate retardation in plane and retardation along thickness direction of a sample, a film or the like, at a wavelength $\lambda$. $Re(\lambda)$ is measured by applying a light having a wavelength of $\lambda$ nm in the normal direction of the film, using KOBRA-21ADH or WR (by Oji Scientific Instruments).

When a film to be tested is represented by an uniaxial or biaxial refractive index ellipsoid, then its $Rth(\lambda)$ is calculate according to the method mentioned below. The selectivity of the measurement wavelength $\lambda$ nm may be conducted by a manual exchange of a wavelength-filter, a program conversion of a measurement wavelength value or the like.

With the in-plane slow axis (determined by KOBRA 21ADH or WR) taken as the inclination axis (rotation axis) of the film (in case where the film has no slow axis, the rotation axis of the film may be in any in-plane direction of the film), $Re(\lambda)$ of the film is measured at 6 points in all thereof, up to +50° relative to the normal direction of the film at intervals of 10°, by applying a light having a wavelength of $\lambda$ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (I) and (II):

$$Re(\theta) = \left[ nx - \frac{(ny \times nz)}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (I)$$

$$Rth = \{(nx+ny)/2 - nz\} \times d \quad (II)$$

wherein $Re(\theta)$ means the retardation value of the film in the direction inclined by an angle $\theta$ from the normal direction; nx means the in-plane refractive index of the film in the slow axis direction; ny means the in-plane refractive index of the film in the direction vertical to nx; nz means the refractive index of the film vertical to nx and ny; and d is a thickness of the film.

When the film to be tested can not be represented by a monoaxial or biaxial index ellipsoid, or that is, when the film does not have an optical axis, then its $Rth(\lambda)$ may be calculated according to the method mentioned below.

With the in-plane slow axis (determined by KOBRA 21ADH or WR) taken as the inclination axis (rotation axis) of the film, $Re(\lambda)$ of the film is measured at 11 points in all thereof, from −50° to +50° relative to the normal direction of the film at intervals of 10°, by applying a light having a wavelength of $\lambda$ nm from the inclined direction of the film. Based on the thus-determined retardation data of $Re(\lambda)$, the mean refractive index and the inputted film thickness, $Rth(\lambda)$ of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, $Nz=(nx-nz)/(nx-ny)$ is further calculated.

EXAMPLES

The present invention will be explained below in further details. Note that materials, reagents, amount and ratio of substances, operations and so forth described in Examples below are appropriately modified, without departing from the spirit of the present invention. The scope of the present invention is, therefore, not limited to the specific examples described below.

1. Examples 1 to 5 and Comparative Example 1

1.-1 Preparation of Biaxial Film

The ingredients below were placed in a mixing tank, stirred under heating so as to dissolve the individual components, to thereby prepare a cellulose acetate solution.
Formulation of Cellulose Acetate Solution

| | |
|---|---|
| Cellulose acetate having a degree of acetylation of 60.9% | 100 parts by mass |
| Triphenylphosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-Butanol (third solvent) | 11 parts by mass |

In another mixing tank, 16 parts by mass of the retardation enhancer shown below, 80 parts by mass of methylene chloride, and 20 parts by mass of methanol were placed, the contents was stirred under heating, to thereby obtain a retardation enhancer solution. To 474 parts by mass of the above cellulose acetate solution, 25 parts by mass of the retardation enhancer solution was mixed, and the mixture was thoroughly stirred to thereby prepare a dope. The amount of addition of the retardation enhancer was 3.8 parts by mass per 100 parts by mass of cellulose acetate.

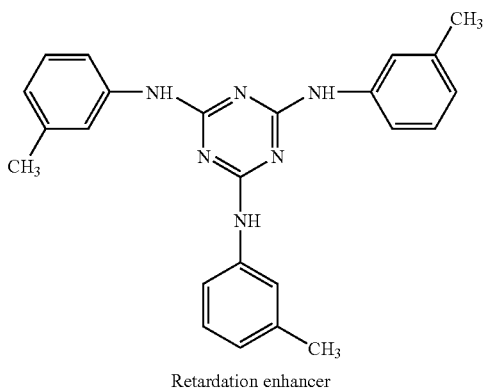

Retardation enhancer

The obtained dope was cast using a band casting machine. The film having a residual solvent content of 15% by mass was stretched at 130° C., using a tenter by a stretch ratio of 21%, to thereby manufacture a cellulose acetate film (80 μm thick). Re and Rth of thus manufactured cellulose acetate film (optical compensation sheet), measured at 550 nm, were Re(550)=36 nm and Rth(550)=141 nm.

1.-2 Formation of Light Absorbing Layer

The surface of thus prepared biaxial film was saponified, and a coating liquid for forming an alignment film, having the formulation below, was coated on the saponified surface using a wire bar coater. The coating was dried under hot air at 60° C. for 60 seconds, and further under hot air at 100° C. for 120 seconds, to thereby for a film.

Formulation of Coating Liquid for Forming Alignment Film

| Modified polyvinyl alcohol shown below | 10 parts by mass |
| Water | 371 parts by mass |
| Methanol | 119 parts by mass |
| Glutaraldehyde | 0.5 parts by mass |

Modified polyvinyl alcohol $$-(CH_2-CH)_{86.3}-(CH_2-CH)_{12}-(CH_2-CH)_{1.7}-$$
$$\phantom{-(CH_2-}|\phantom{H)_{86.3}-(CH_2-}|\phantom{H)_{12}-(CH_2-}|$$
$$\phantom{-(CH_2-}OH\phantom{)_{86.3}-(CH_2}OCOCH_3\phantom{)_{12}-(}OCONHCH_2CH_2OCOC-CH_2$$
$$\phantom{-(CH_2-}\phantom{OH)_{86.3}-(CH_2-CH)_{12}-(CH_2-CH)_{1.7}-}|$$
$$\phantom{-(CH_2-}\phantom{OH)_{86.3}-(CH_2-CH)_{12}-(CH_2-CH)_{1.7}-}CH_3$$

Methyl ethyl ketone solutions containing 100 parts by mass of compound 1 shown below, 3 parts by mass of a photo-polymerization initiator (Irgacure 819, from CIBA Specialty Chemicals Inc.), 1.0 part by mass of the onium salt shown below, 0.2 parts by mass of an air-interface-side vertical alignment enhancer shown below, and a specific amount, as listed in Table 1, of each of dyes 1 to 4 shown below, were respectively prepared.

Each of thus prepared coating liquids was coated on the surface of the alignment film, using a wire bar. The film was then stretched over a metal frame, heated in a thermostat chamber at 135° C. for one minute, cooled to temperature specified in Table 1, irradiated with UV using a 120-W/cm high pressure mercury lamp for 15 seconds so as to fix the alignment, allowed to cool to room temperature, to thereby form each light absorbing layer.

<

Each light absorbing layer formed as described in the above was observed under a polarization microscope. All layers were found to have the molecules aligned vertically and uniformly on the surface of the film.

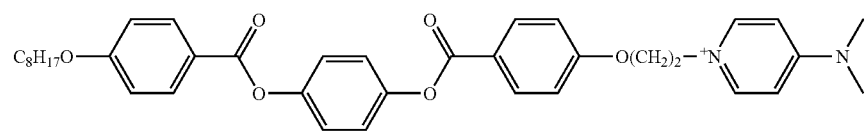

Onium salt

-continued

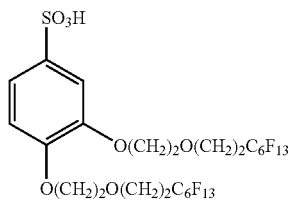

Air-interface-side vertical alignment enhancer

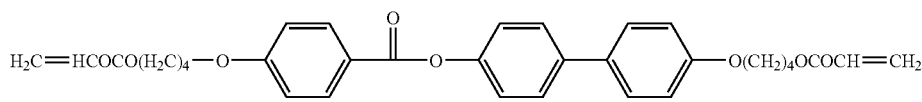

Liquid crystal compound 1

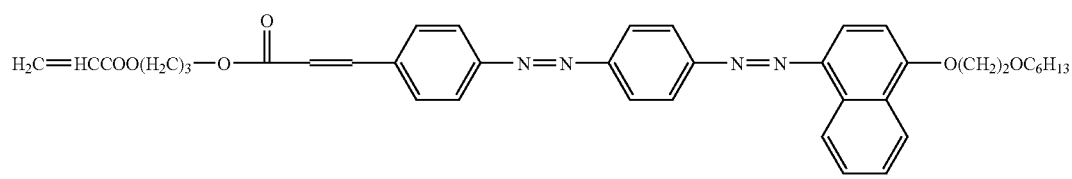

Dye 1

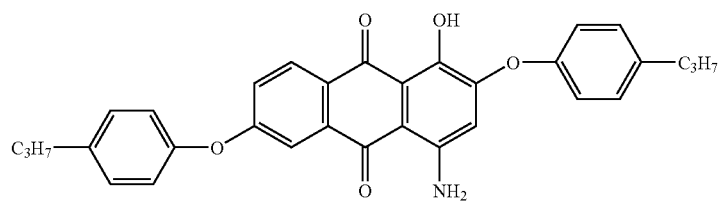

Dye 2

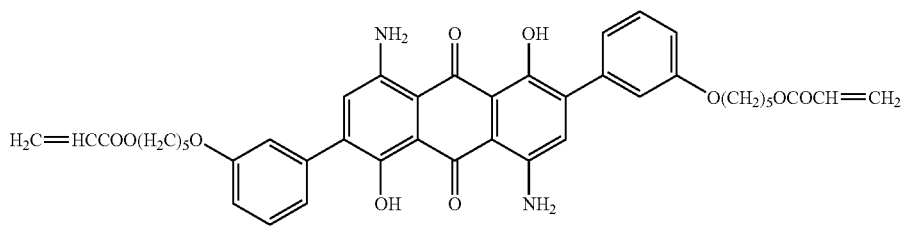

Dye 3

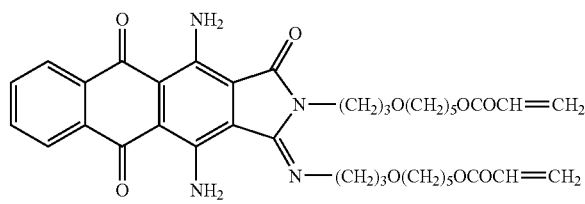

Dye 4

| | Dye concentration (amount in parts by mass, per 100 parts by mass of liquid crystal compound 1) | | | Thickness (μm) | Liquid crystal phase appears in the process of polymerization | Polymerization temperature |
|---|---|---|---|---|---|---|
| | Dye 1 | Dye 2 | Dye 3 + Dye 4 | | | |
| Light absorbing layer 1 | 0.00 | 0.18 | 0.92 | 3 | Ne*1 | 138° C. |
| Light absorbing layer 2 | 0.00 | 0.36 | 2.55 | 3 | SmA*2 | 120° C. |

| | | | | | | |
|---|---|---|---|---|---|---|
| Light absorbing layer 3 | 0.00 | 0.44 | 3.70 | 3 | SmA*2 | 120° C. |
| Light absorbing layer 4 | 0.00 | 0.44 | 3.85 | 3 | SmB*3 | 80° C. |
| Light absorbing layer 5 | 0.12 | 0.35 | 3.13 | 4.5 | SmB*3 | 80° C. |

*1: nematic phase
*2: smectic A phase
*3: smectic B phase

For the purpose of identifying the absorption anisotropy of each light absorbing layer formed on the biaxial film, polarization characteristics of each of thus obtained optical compensation films (stacked product of the biaxial film and the light absorbing layer) were determined while varying the polar angle in the direction of in-plane slow axis of the biaxial film. More specifically, Mueller matrices were measured using a measuring instrument "AxoScan" from Axometics Inc., while varying the polar angle in the direction of in-plane slow axis at 10° intervals from −50 to 5°, and the degree of absorption anisotropy "A" was determined by fitting. The degree of absorption anisotropy "A" was determined at three wavelengths of 450 nm, 550 nm and 630 nm. More specifically, A(450), A(550) and A(630) were respectively determined. Results are shown in the table below.

| | A(450) | A(550) | A(630) |
|---|---|---|---|
| Light-absorbing layer 1 | 0 | 0.07 | 0.01 |
| Light-absorbing layer 2 | 0 | 0.02 | 0.03 |
| Light-absorbing layer 3 | 0 | 0.025 | 0.043 |
| Light-absorbing layer 4 | 0 | 0.03 | 0.05 |
| Light-absorbing layer 5 | 0.01 | 0.035 | 0.06 |

Optical compensation films having the light-absorbing layers 1 to 5 in the above are denoted as Example 1 to 5, respectively. The biaxial film not provided thereon with the light absorbing layer is denoted as Comparative Example 1.

1.-3 Preparation of Polarizer Plate

Polarizer films were manufacture by allowing the stretched polyvinyl alcohol film to adsorb iodine.

Each of the films of Examples 1 to 5, and Comparative Example 1 was bonded to one surface of the polarizer film, using a polyvinyl alcohol-base adhesive. When the films of Examples 1 to 5 are used, the surface of each light absorbing layer and the surface of the polarizer film were bonded.

A commercially-available cellulose triacetate film (Fujitac TD80UF, from FUJIFILM Corporation) was saponified, and bonded to the opposite side of the polarizer film, using a polyvinyl alcohol-base adhesive.

Each of the biaxial films of Examples 1 to 5 and Comparative Example 1 was disposed so as to align the in-plane slow axis thereof in parallel with the transmission axis of the polarizer film. The commercially-available cellulose triacetate film was disposed so as to align the in-plane slow axis thereof orthogonal to the transmission axis of the polarizer film. Each polarizer plate was prepared in this way.

1.-4 Preparation of Liquid Crystal Display Device

A pair of polarizer plates and a pair of optical compensation sheets, provided to a liquid crystal display device (KDL-40J5000, from SONY Corporation) using a VA-mode (vertically-aligned) liquid crystal cell, were peeled off, and instead the polarizer plates respectively prepared in Examples 1 to 5 and Comparative Example 1 were bonded to the liquid crystal cell, one on the observer's side and the other on the back light side, so as to oppose each cellulose acetate film with the liquid crystal cell, while placing a pressure-sensitive adhesive in between. It was found from a measurement that Δnd, which represents birefringence of the liquid crystal display device, was Δnd=300 nm. The polarizer plate on the observer's side was disposed so as to vertically align the transmission axis, and the polarizer plate on the back light side was disposed so as to laterally align the transmission axis, in the crossed Nicol arrangement.

1.-5 Evaluation of Liquid Crystal Display Devices

Each of thus prepared VA-mode liquid crystal display devices measured using a measuring instrument (EZ-Contrast 160D, from ELDIM), in order to find CR at an azimuth of 45° and a polar angle of 60° in the black state, transmittance at an azimuth of 450 and a polar angle of 60° in the black state, and color shift Δxy in the black state at a fixed polar angle of 60° under varied azimuth from 0 to 360°. Results are shown in the table below.

| | Biaxial film | | Light absorbing 3layer | | | Transmittance at azimuth = 45°, polar angle = 60°, in black state (%) | Color shift in black state at polar angle = 60° Δxy |
|---|---|---|---|---|---|---|---|
| | Re (nm) | Rth (nm) | A (450) | A (550) | A (630) | | |
| Comparative Example | 36 | 141 | None | | | 0.18% | 0.11 |
| Example 1 | 36 | 141 | 0 | 0.07 | 0.01 | 0.13% | 0.07 |
| Example 2 | 36 | 141 | 0 | 0.02 | 0.03 | 0.06% | 0.01 |

-continued

|  | Biaxial film | | Light absorbing 3 layer | | | Transmittance at azimuth = 45°, polar angle = 60°, in black state (%) | Color shift in black state at polar angle = 60° Δxy |
|---|---|---|---|---|---|---|---|
|  | Re (nm) | Rth (nm) | A (450) | A (550) | A (630) | | |
| Example 3 | 36 | 141 | 0 | 0.025 | 0.043 | 0.05% | 0.01 |
| Example 4 | 36 | 141 | 0 | 0.03 | 0.05 | 0.07% | 0.01 |
| Example 5 | 36 | 141 | 0.01 | 0.035 | 0.06 | 0.08% | 0.03 |

It was understood from the results shown in the table, that Examples 1 to 5, lower in the transmittance in the black state and smaller in the color shift as compared with Comparative Example 1, were improved in both aspects.

All VA-mode liquid crystal display devices of Examples showed desirable contrast in the direction of normal line.

2. Examples 6 to 10

The polarizer plates and the VA-mode liquid crystal display devices of Examples 6 to 10 were prepared and evaluated similarly to as described in Examples 1 to 5, except that each optical compensation film and the polarizer film were bonded while opposing the surface of the biaxial film having no light absorbing layer formed thereon and the surface of the polarizer film. Results are shown in the table below.

|  | Biaxial film | | Light absorbing layer | | | Transmittance at azimuth = 45°, polar angle = 60°, in black state (%) | Color shift in black state at polar angle = 60° Δxy |
|---|---|---|---|---|---|---|---|
|  | Re (nm) | Rth (nm) | A (450) | A (550) | A (630) | | |
| Example 6 | 36 | 141 | 0 | 0.07 | 0.01 | 0.13% | 0.07 |
| Example 7 | 36 | 141 | 0 | 0.02 | 0.03 | 0.06% | 0.01 |
| Example 8 | 36 | 141 | 0 | 0.025 | 0.043 | 0.05% | 0.01 |
| Example 9 | 36 | 141 | 0 | 0.03 | 0.05 | 0.07% | 0.01 |
| Example 10 | 36 | 141 | 0.01 | 0.035 | 0.06 | 0.08% | 0.03 |

It was understood from the results shown in the table, that also Examples 6 to 10, lower in the transmittance in the black state and smaller in the color shift as compared with Comparative Example 1, were improved in both aspects. It was understood also that equivalent effects may be obtained even if positions of the light absorbing layer and the transparent film were exchanged.

All VA-mode liquid crystal display devices of Examples showed desirable contrast in the direction of normal line.

3. Examples 11 to 15 and Comparative Example 2

Figure 5A:
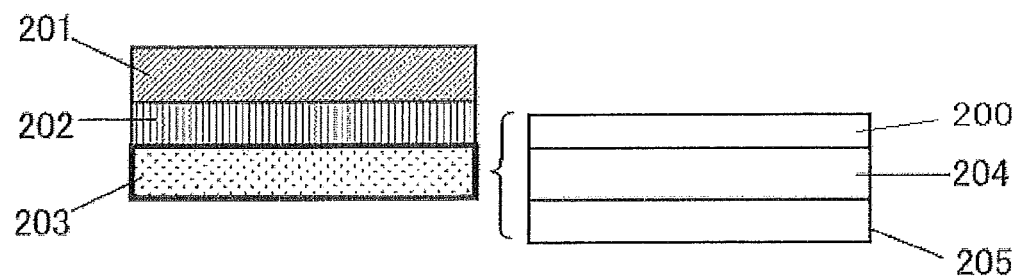
FIG. 5A is a schematic drawing illustrating optical compensation films prepared in Examples 11 to 15 (the light absorbing layer not illustrated) and an elliptic polarizer plate.

Optical compensation sheets and elliptic polarizer plates configured as illustrated in FIG. 5A were prepared. More specifically, using a stacked product composed of a transparent base film 204 and an optically anisotropic layer 205 as illustrated in FIG. 5A, each light absorbing layer 200 was formed on the surface of the transparent base film 204 having no optically anisotropic layer 205 formed therein, similarly to as described in Examples 1 to 5, to thereby prepare the optical compensation films 203 of Examples 11 to 15. Each optical compensation film was further bonded to a polarizer film 202 and a polarizer plate protective film 201, to thereby prepare each elliptic polarizer plate. Details of manufacturing of the transparent base film 204 and the optically anisotropic layer 205 were referred to a method described in Example 1-3 in Japanese Translation of PCT International Publication for Patent Application No. 2008-503763.

<Preparation of Cellulose Acetate Film>

The ingredients below were placed in a mixing tank, stirred under heating so as to dissolve the individual components, to thereby prepare a cellulose acetate solution.

(Composition of Cellulose Acetate Solution)

| Cellulose acetate having a degree of acetylation of 60.9% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

In another mixing tank, 16 parts by mass of the retardation enhancer shown below, 92 parts by mass of methylene chloride, and 8 parts by mass of methanol were placed, the contents was stirred under heating, to thereby obtain a retardation enhancer solution. To 474 parts by mass of the above cellulose acetate solution, 31 parts by mass of the retardation enhancer solution was mixed, and the mixture was thoroughly stirred to thereby prepare a dope.

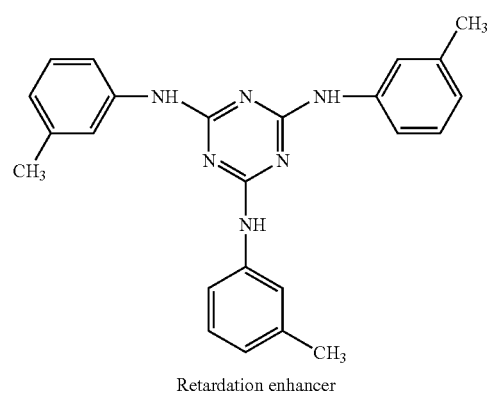

Retardation enhancer

The obtained dope was cast using a band casting machine. The resultant film was cooled to a surface temperature of 40° C., dried under hot air at 70° C. for one minute, the film was separated from the band, and dried under dry air at 140° C. for 10 minutes, to thereby prepare a cellulose acetate film (80 μm thick) having a residual solvent content of 0.3% by mass. Re value and Rth value of thus prepared cellulose acetate film (transparent support and transparent protective film) were measured at 546 nm, using an ellipsometer (M-150, from JASCO Corporation). The values were found as Re=8 nm, and Rth=91 nm.

Thus prepared cellulose acetate film was then immersed in a 2.0 N potassium hydroxide solution (25° C.) for 2 minutes, neutralized with sulfuric acid, washed with pure water, and dried. The surface energy of the film measured by the contact angle method was found to be 63 mN/m.

The cellulose acetate film was used as the transparent base film 204 illustrated in FIG. 5A.

<Manufacturing of Alignment Film for Forming Optically Anisotropic Layer>

A coating liquid having the formulation below was coated on the cellulose acetate film using a #16 wire bar coater to as much as 28 mL/m². The coating was dried under hot air at 60° C. for 60 seconds, and further under hot air at 90° C. for 150 seconds.

Formulation of Coating Liquid for Forming Alignment Film

| | |
|---|---|
| Modified polyvinyl alcohol shown below | 20 parts by mass |
| Water | 360 parts by mass |
| Methanol | 120 parts by mass |
| Glutaraldehyde (crosslinking agent) | 0.5 parts by mass |

Modified polyvinyl alcohol

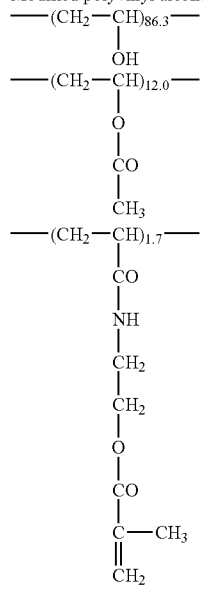

<Preparation of Optically Anisotropic Layer>

In a basic process of manufacturing optical compensation sheet, a web is fed by a feeder, allowed to pass over a rubbing roll while being guided by guide rolls, subjected to a coating process using a slot die coater, and immediately thereafter allowed to go through a drying process. The web is then allowed to pass through a drying zone, a heating zone, and an irradiation zone using UV lamps, and wound up by a winder. In order to sufficiently adjust decompression with respect to a bead, a decompression chamber was provided on the side opposite to the direction of travel of the web, at a position not brought into contact with the bead.

The lip land length $I_{UP}$ of a slot die on the upstream side was adjusted to 1 mm, and the lip land length $I_{LO}$ on the downstream side was adjusted to 50 μm. Using the slot die, the coating liquid was coated on the web in an amount of 5 mL/m², so as to form a wet film of 5 μm thick. The coating speed was adjusted to 50 m/min. The web used herein was a cellulose acetate film having the alignment film coated as described in the above, and the width of gap between a lip land on the downstream side and a cellulose triacetate base, which is the web, was adjusted to 40 μm. The alignment film was rubbed on the coated surface thereof, and was directly fed to the coating process for coating. The rubbing was given to the alignment film in the direction in parallel with the slow axis of the cellulose acetate film. The peripheral speed of rotation of a rubbing roller in the process of rubbing was adjusted to 5.0 m/sec. and pressure to a resin layer for the alignment film was set to $9.8 \times 10^{-3}$ Pa.

The coating liquid having Formulation 1 was used for forming the optically anisotropic layer shown below. The coating speed was adjusted to 50 m/min. Immediately after the coating, the coated film was initially dried as illustrated in FIG. 5(a) of Published Japanese Translation of PCT International Publication for Patent Application No. 2008-503763, using a drier. The total length of the drier was set to 5 m. A condensation plate 30 of the drier was disposed at a predetermined angle of inclination so as to make the end thereof, on the downstream side in the direction of travel, depart from the coated film. The distance between the condensation plate and the web, temperature of the condensation plate, and temperature of the coating liquid were controlled so as to adjust the Rayleigh number to 1200. The web initially dried by the drier was allowed to pass through a heating zone set to 130° C., then irradiated with UV using 160-W/cm UV lamps in an atmosphere at 60° C., to thereby form the optically anisotropic layer 205 as illustrated in FIG. 5A. An optical compensation film (KH-1) was prepared in this way.

(Formulation 1 of Coating Liquid for Forming Optically Anisotropic Layer)

The ingredients below were dissolved in 102 parts by mass of methyl ethyl ketone, to thereby prepare a coating liquid.

| | |
|---|---|
| Discotic liquid crystalline compound shown below | 41.0 parts by mass |
| Ethylene oxide-modified trimethylolpropane triacrylate (V#360, from Osaka Organic Chemical Industry, Ltd.) | 4.06 parts by mass |
| Cellulose acetate butyrate (CAB551-0.2, from Eastman Chemical Company) | 0.34 parts by mass |
| Cellulose acetate butyrate (CAB531-1, from Eastman Chemical Company) | 0.11 parts by mass |
| Fluoroaliphatic group-containing polymer 1 shown below | 0.03 parts by mass |
| Fluoroaliphatic group-containing polymer 2 shown below | 0.23 parts by mass |
| Photo-polymerization initiator (Irgacure 907, from CIBA Specialty Chemicals Inc.) | 1.35 parts by mass |

-continued

| Sensitizer (Kayacure DETX, from Nippon Kayaku Co., LTd.) | 0.45 parts by mass |

Discotic liquid crystal compound

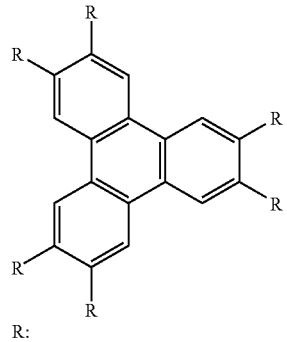

R:

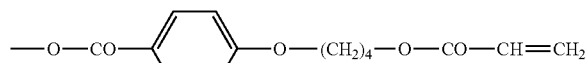

Fluoroaliphatic group-containing polymer 1

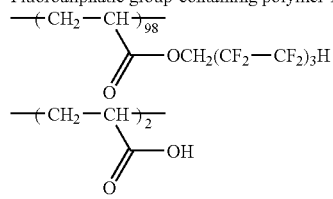

Mw 25000

Fluoroaliphatic group-containing polymer 2

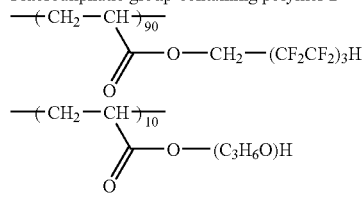

Mw 14,000

<Evaluation of Characteristics of Optical Compensation Film>

Thus manufactured optical compensation film (KH-1) was placed between the polarizer plates in the crossed-Nicol arrangement, and the surface property was observed. The optically anisotropic layer was found to have no defects such as schlieren, and to be uniform showing no non-uniformity even observed at varied viewing angles from all directions. The optical compensation film (KH-1) was also sliced using a microtome to produce ultra-thin sections so as to align the cross-sectional planes in the direction of rubbing, and the sections were observed under a polarization microscope while rotating the stage. It was found that the azimuth causative of extinction varied in the thickness-wise direction, clearly proving the hybrid alignment.

Figure 5B:
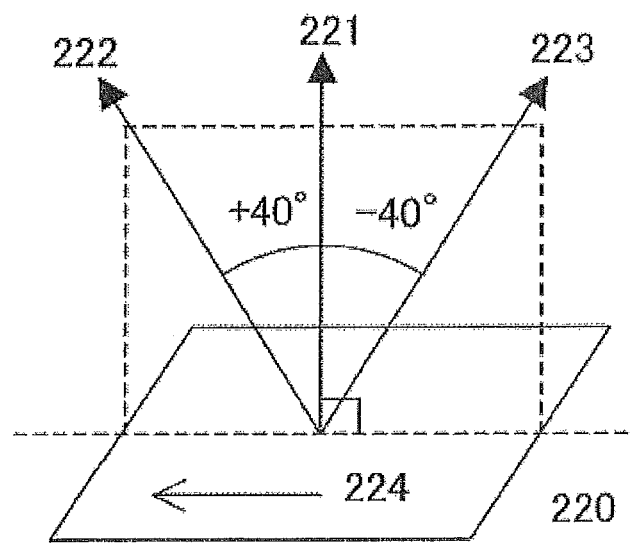
FIG. 5B is a schematic drawing illustrating directions of measurement of optical characteristics.

Retardation of thus obtained optical compensation film (KH-1) was measured using an ellipsometer (M-150, from JASCO Corporation) on the 220 surface, illustrated in FIG. 5B, at an observation angle of 0° and in directions of ±40°. Retardation of the cellulose acetate film used as the support was also measured by similar procedures, and a retardation value of the optically anisotropic layer was calculated by subtraction. Results were Re(0)=50 nm, Re(+40)/Re(0)=1.68, and Re(−40)/Re(0)=0.45.

Thus prepared optical compensation film (KH-1) was provided also with the light absorbing layer 200, on the surface of the transparent base film 204 having no optically anisotropic layer 205 formed thereon by coating, by the same method with that in Examples 1 to 5, to thereby prepare the optical compensation films of Examples 11 to 15 (optical compensation film 203 illustrated in FIG. 5A). More specifically, the optical compensation films of Examples 11 to 15 correspondingly have the light absorbing layers used in Example 1 to 5.

<Preparation of Polarizer Plate>

Each of thus prepared optical compensation film was immersed in a 1.5N aqueous NaOH solution at 50° C. for 1.5 minutes so as to hydrophilize the surface thereof, neutralized with sulfuric acid, washed with water, and allowed to dry. Also a cellulose triacetate film of 80 μm thick (TD-80U, from FUJIFILM Corporation) was similarly hydrophilized. A stretched polyvinyl alcohol film was allowed to adsorb iodine to thereby prepare a polarizer film, and the optical compensation film and a cellulose triacetate film, both of which already hydrophilized as described in the above, were respectively bonded to both surfaces of the polarizer film, using a polyvinyl alcohol-base adhesive. The optical compensation film was bonded, so as to oppose the surface thereof having no optically anisotropic layer formed thereon by coating (that is, the surface of the light absorbing layer) to the polarizer film. The polarizer film was disposed so as to align the absorption axis thereof in parallel with the slow axis of the base (in parallel with the direction of casting) of the optical compensation film. The polarizer plate was prepared in this way.

<Preparation of Liquid Crystal Cell>

Figure 6:
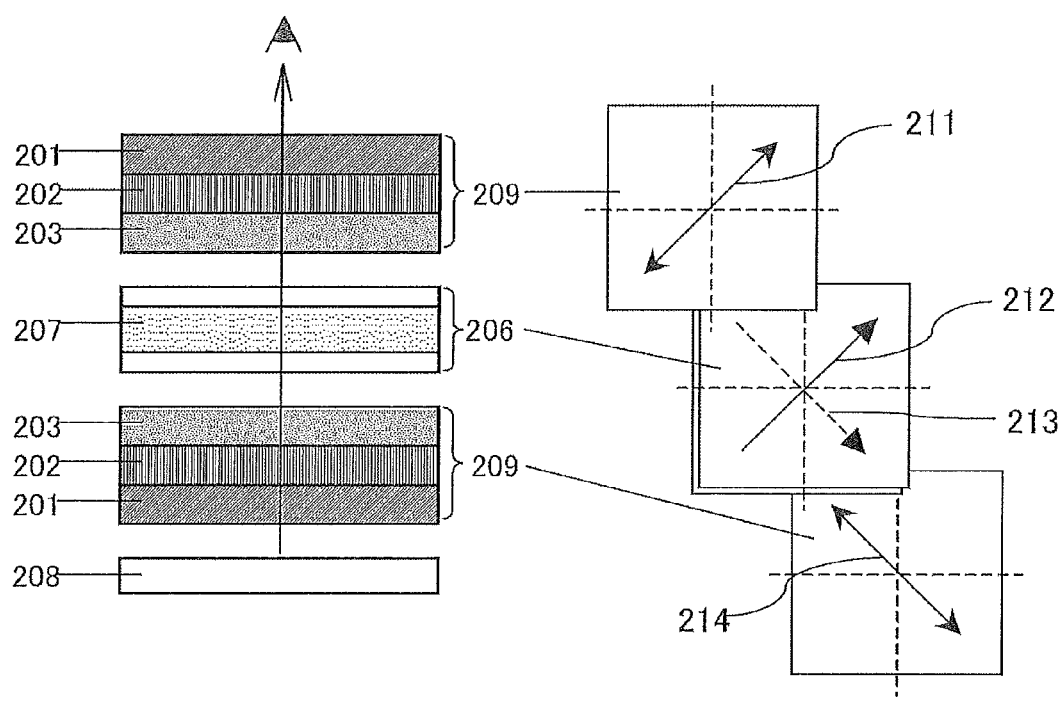
FIG. 6 is a schematic drawing illustrating positional relation of the optical compensation film (the light absorbing layer not illustrated) and elliptic polarizer plates, in TN-mode liquid crystal display devices prepared in Examples 11 to 15.

A liquid crystal cell having a cell gap "d" of 5 μm was prepared by encapsulating a liquid crystal material, which shows a positive dielectric anisotropy, by drop-wise injection, so as to adjust Δnd to 400 nm (Δn represents refractive index anisotropy of the liquid crystal material). The tilt angle of the liquid crystal layer of the liquid crystal cell was adjusted to 90°, and the previously manufactured polarizer plates were bonded to the upper and lower sides of the cell so as to align the absorption axis thereof in the direction of rubbing of the upper and lower substrates of the liquid crystal cell, while placing a pressure sensitive adhesive in between, as illustrated in FIG. 6.

<Optical Measurement of Prepared Liquid Crystal Display Device>

Each of thus prepared liquid crystal display device was applied with a voltage of a 60-Hz rectangular waveform. The display device was configured to operate based on the normally-white mode, showing the white state at 1.5 V, and the black state at 5.6 V. Chromaticity x, y were measured in the axial direction (which means the direction of the normal line) in the black state, and at an azimuth of 90° (upward) and a polar angle of 60°, using a measuring instrument (EZ-Contrast 160D, from ELDIM), and the color shift Δxy, which is the difference therebetween, was measured. Results are shown in the table below.

| | Light absorbing layer | | | Chromaticity at azimuth = 90°, polar angle = 60° | | Color shift in black state |
|---|---|---|---|---|---|---|
| | A (450) | A (550) | A (650) | x | Y | Δxy |
| Comparative Example 2 | None | | | 0.216 | 0.086 | 0.142 |
| Example 11 | 0 | 0.07 | 0.01 | 0.214 | 0.093 | 0.139 |

-continued

|  | Light absorbing layer | | | Chromaticity at azimuth = 90°, polar angle = 60° | | Color shift in black state |
| --- | --- | --- | --- | --- | --- | --- |
|  | A (450) | A (550) | A (650) | x | Y | Δxy |
| Example 12 | 0 | 0.02 | 0.03 | 0.219 | 0.098 | 0.132 |
| Example 13 | 0 | 0.025 | 0.043 | 0.231 | 0.108 | 0.117 |
| Example 14 | 0 | 0.03 | 0.05 | 0.242 | 0.109 | 0.107 |
| Example 15 | 0.01 | 0.035 | 0.06 | 0.246 | 0.109 | 0.104 |

It may be understood from the results shown in the table, that Examples 11 to 15 were improved in blueing of the black state (values x, y decreased), which has been known as a drawback in the TN-mode liquid crystal display devices, as compared with Comparative Example 2, and moderated also in the color shift.

What is claimed is:

1. An optical compensation film comprising a light absorbing layer capable of absorbing at least light of wavelength λ nm in the visible light region, Wherein the light absorbing layer has absorption anisotropy, light absorption coefficient kz(λ) in the direction normal to the surface of layer (in the direction of z-axis), with respect to light of wavelength λ nm in the visible light region, being larger than in-plane (x-y plane) light absorption coefficients kx(λ) and ky(λ), and the light absorbing layer has the larger degree of absorption anisotropy at the light of longer wavelength.

2. The optical compensation film of claim 1, wherein the light absorbing layer has a parameter A(λ) with respect to light of wavelength λ nm in the visible light region, which satisfies A(450)<A(550)<A(630):

A(λ) being defined as $$A(\lambda) = \{kz(\lambda) - (kx(\lambda) + ky(\lambda))/2\} \times d/\lambda,$$

where d represents the thickness of the light absorbing layer, kx(λ) and ky(λ) represent absorption coefficients with respect to light of wavelength λ respectively in the directions of x-axis and y-axis which are orthogonal to each other in the plane of the light absorbing layer, and kz(λ) represents a light absorption coefficient with respect to light of wavelength λ in the direction of z-axis which is normal to the plane (x-y plane) of the layer.

3. The optical compensation film of claim 2, wherein the light absorbing layer has A(450) of from 0 to 0.01, A(550) of from 0.02 to 0.03, and A(630) of from 0.03 to 0.05.

4. The optical compensation film of claim 1, wherein the light absorbing layer comprises at least a rod-like liquid crystal fixed in a vertical alignment, and a dye.

5. The optical compensation film of claim 1, further comprising a transparent film.

6. The optical compensation film of claim 1, further comprising a biaxial transparent film.

7. The optical compensation film of claim 1, further comprising an optically anisotropic layer comprising a discotic liquid crystal fixed in a hybrid alignment, or the light absorbing layer comprising a discotic liquid crystal fixed in a hybrid alignment.

8. A liquid crystal display device comprising the optical compensation film of claim 1.

9. A VA-mode liquid crystal display device comprising:
a pair of polarizers,
a VA-mode liquid crystal cell disposed therebetween, and
the optical compensation film of claim 6 disposed between each of the pair of polarizers and the liquid crystal cell.

10. A TN-mode liquid crystal display device comprising:
a pair of polarizers,
a TN-mode liquid crystal cell disposed therebetween, and
the optical compensation film of claim 7 disposed between each of the pair of polarizers and the liquid crystal cell.

* * * * *